Sept. 19, 1950     A. H. SLEPICKA     2,522,904
FILTER
Filed Nov. 6, 1946     2 Sheets-Sheet 1
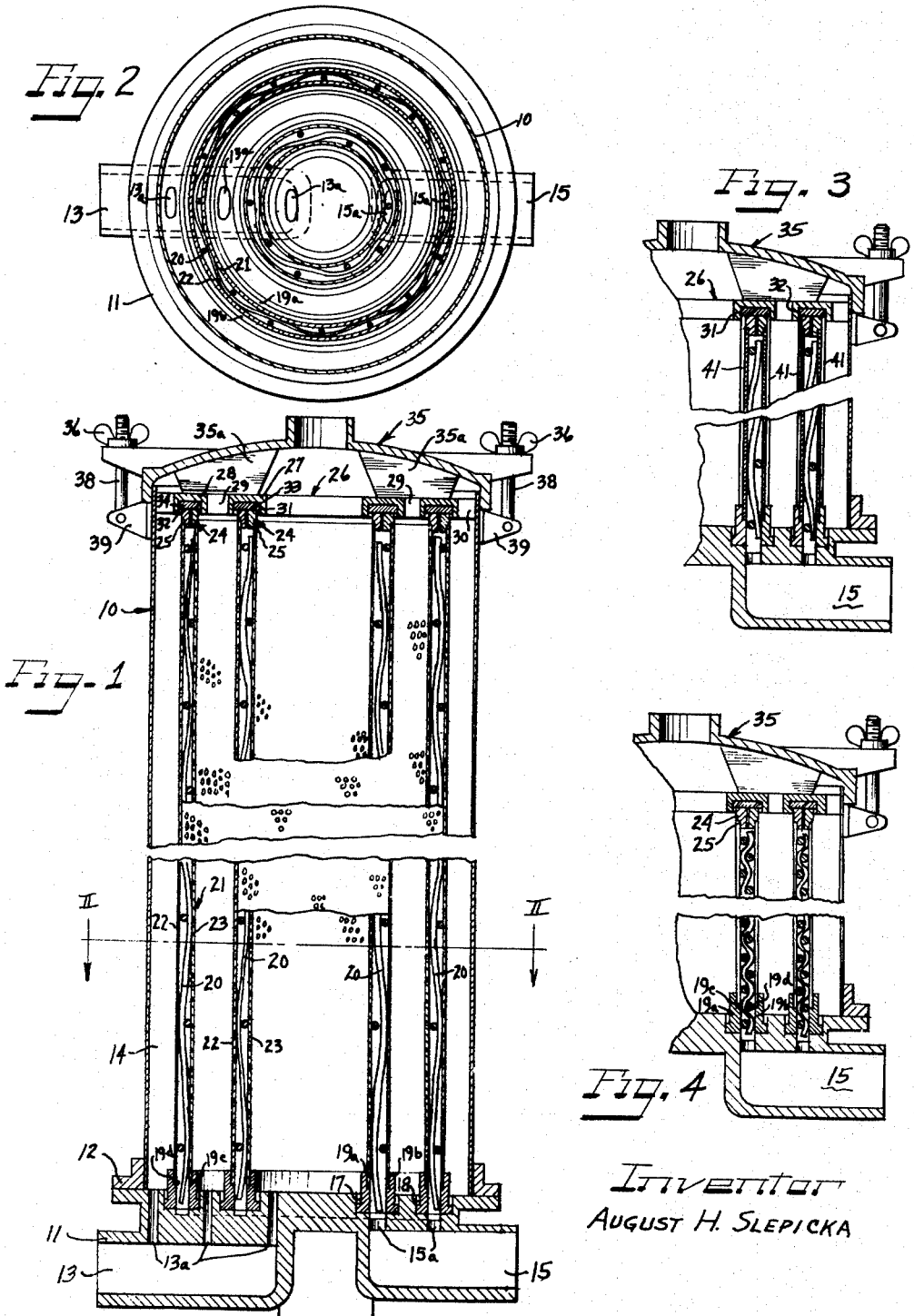
Inventor
AUGUST H. SLEPICKA
By The Firm of Charles W. Hills Attys.

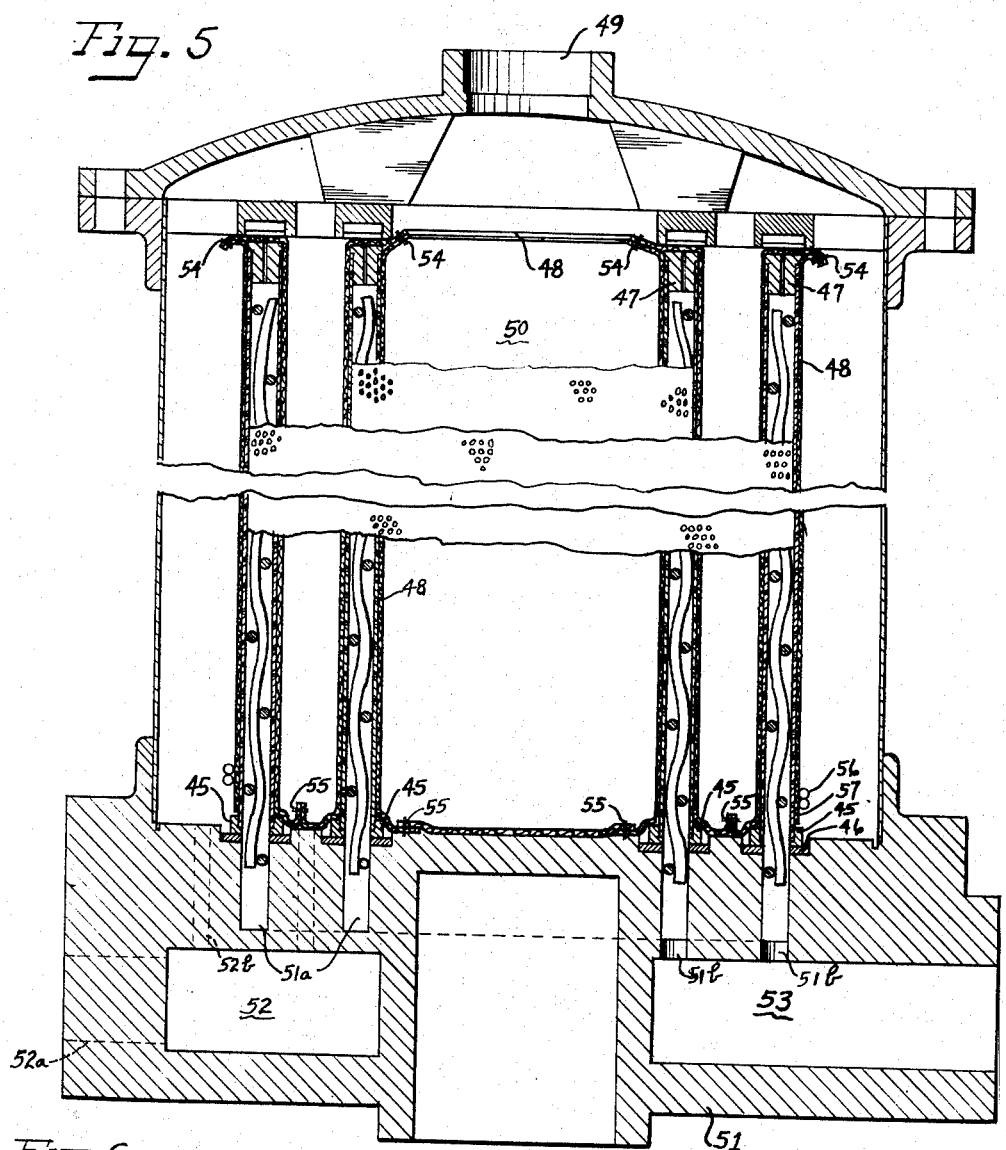

Patented Sept. 19, 1950

2,522,904

UNITED STATES PATENT OFFICE 2,522,904

FILTER

August H. Slepicka, Oak Park, Ill., assignor to Frank B. Lomax Co., Chicago, Ill., a partnership Application November 6, 1946, Serial No. 708,164

6 Claims. (Cl. 210—183)

1

This invention relates to improvements in a filter and more particularly to the type of filter employed to mechanically separate foreign matter from a material as the material passes through restricted openings in the filter element.

In any device for filtering material by mechanically separating the dirt particles on its outer surface while allowing the clean material to pass through the outer casing, it is necessary to provide means for renewing or cleaning the surface on which the dirt has accumulated. The most general type of filter element of this class consists of a perforated cylinder member which may be cleaned in place or removed for washing. However, there are many filtering uses that require a filter that will remove smaller particles of dirt from the material than is possible with the cylindrical perforated member. It is desirable therefore to have an element for filtering material that will remove very small particles of dirt and at the same time be easily removed, cleaned and replaced.

Furthermore, filters of this general type using perforated cylindrical members have a tendency to buckle when furnished in a size which requires an element which is long as compared to its diameter, or when the material to be filtered is brought into the filter casing under pressure. Moreover, such a thin walled cylindrical element must remain unanchored at the top cover since any downward pressure exerted by the cover will in itself tend to buckle the element.

It is therefore an important object of this invention to provide a filter element that will remove on its surface very small particles of dirt and which is easily removed, cleaned and replaced.

It is another object of this invention to provide a filter employing cylindrical elements that are efficient filtering mediums and are sufficiently rigid in all supplied lengths to withstand buckling due to the pressure exerted by the material being filtered.

Another object of this invention is the provision of means for clamping the novel filtering element in place in the filtering case.

Another and further object of this invention resides in the provision of a filter element having efficient filtering covering made of inexpensive material which may be easily and economically removed from the element structure and replaced with a new cover.

Another object of this invention is the provision of a filter that is efficient in operation and simple in construction.

2

In accordance with the general features of this invention there is provided a filter comprising two concentric filter elements disposed in a casing, each of said elements including two perforated metal cylinders with a wire mesh member disposed therebetween whereby said element is made rigid and capable of withstanding, without buckling, normal filtering pressures.

Another feature of this invention is the provision of a filtering element comprising two perforated cylindrical members, one of which carries indentations extending across the space between the members to form support arms.

A further feature of this invention is the provision of grooves in the upper and lower cover of the filter casing for locating and anchoring the element.

A still further feature resides in the provision of a rigid cylindrical filter element having a covering of material such as filter paper, felt or cloth fabric which is capable of removing small particles of dirt and which may be quickly removed and cleaned.

Another feature of this invention is the provision of a rigid filter element comprising a perforated cylindrical member covered with a layer of filter paper which may be quickly removed and replaced.

Other objects and features of this invention will be apparent to one skilled in the art from the following detailed description, taken in connection with the accompanying drawings, in which:

Figure 1 is a sectional side elevational view of a filter embodying the features of this invention;

Figure 2 is a horizontal sectional view taken substantially on line II—II of Fig. 1;

Figure 3 is a fragmentary vertical sectional view of a modified embodiment of this invention;

Figure 4 is a fragmentary vertical sectional view of a second modification of the filter of this invention;

Figure 5 is a fragmentary vertical sectional view, partly broken away, of a third modification of the filter of this invention;

Figure 6 is a fragmentary vertical sectional view of a modified form of filter element;

Figure 7 is a fragmentary vertical sectional view of a modified form of filter element; and Figure 8 is a fragmentary vertical sectional view of a modified form of filter element.

In Fig. 1 there is illustrated a filter having a casing, generally indicated by the reference numeral 10. This casing, which may be made of any suitable relatively rigid material, such as steel or plastic sheets, is open at both ends. At its lower end the casing 10 is adapted to be positioned on a lower header 11 inside a circular angle member 12 which is secured, as by welding, to said lower header 11.

As a means of bringing material to be filtered into the filter casing 10 there is provided an inlet port 13 in the lower header 11 projecting outwardly to one side thereof. This inlet port is connected to a filtering chamber 14 by a plurality of substantially elliptically-shaped inlet passages 13a in the upper part of the header 11. An outlet port 15 is also provided in the header 11 disposed directly opposite the inlet port 13. A plurality of outlet passages 15a allows the filtered material to pass from the filtering chamber 14 to the outlet port 15.

For the purpose of locating and supporting the filter element in the filter casing, a pair of circular concentric grooves 17 and 18 are provided in the upper surface of the lower header 11. These grooves 17 and 18 are spaced radially from each other, each groove being adapted to receive therein a circular guide member 19 comprising inner and outer rings 19a and 19b, respectively. A set of rings 19a and 19b is adapted to be positioned in spaced relation in the locating grooves 17 and 18, for receiving therebetween the lower end of a wire mesh reinforcing member 20 of a filter element 21.

Each filter element 21 includes an outer and an inner perforated cylindrical member 22 and 23, respectively, suitably made of light gauge stainless steel sheeting, having a wire mesh reinforcing member 20 positioned between the perforated cylinders. It has been determined by tests that cylinders having perforations approximately $\frac{1}{32}$ inch in diameter, triangularly spaced $\frac{3}{32}$ inch on center, will give excellent filtering efficiency. It has been further determined that a wire mesh made of $\frac{1}{16}$ inch wire woven in approximately ¾ inch square mesh and crimped so that alternate portions abut the surface of the cylinders between which it is inserted will assure rigidity and non-collapse of the cylinders.

As a means of locating and supporting the perforated cylindrical members 22 and 23, there is provided on the opposing inner faces of the guide rings 19a and 19b circular shoulders 19c and 19d respectively. The cylindrical members are positioned on these shoulders with the wire mesh 20 inserted therebetween.

It is to be particularly noted that the outlet passages 15a are located immediately under the guide grooves 17 and 18 so that any material moving toward the outlet port 15 must pass to the inside of the filter element before it can reach the outlet port 15.

To hold the cylindrical members 22 and 23 of each element in spaced relation at the upper end there is provided for each element a circular spacer block 24, which for convenience in assembly may be made in two pieces, an inner and an outer ring each of which has a recess portion 25 over which the cylindrical member may be positioned.

A positioning plate 26 is provided which comprises an inner ring 27 and an outer ring 28 held in spaced radial relation by a plurality of spacer arms 29, said outer ring also being held in spaced radial relation to the inner wall of said filter casing 10 by a plurality of outwardly projecting arms 30. Circular grooves 31 and 32 are cut in the lower face of the locating rings 27 and 28 which are adapted to receive therein sealing rings 33 and 34, respectively.

In assembling the filter, the seal rings are positioned in the grooves 31 and 32 and then placed over the spacer block 24 at the upper end of each filter element 21. A cover assembly 35, having a plurality of downwardly projecting arms 35a for clamping down on the positioning plate 26, is then clamped down on the elements by means of wing nuts 36, operable on bolts 38 which are pivotally secured by pin 39 to arms 40 outwardly projecting from the casing 10.

From the foregoing description it is evident that there is provided in this invention a simple, efficient filter, the element of which is easily removed and replaced and which is provided with a stiffening member capable of preventing collapse of the element structure.

In Figure 3 there is illustrated a modification of the filter of Figure 1. As previously mentioned it is sometimes desirable to have a filtering substance that will remove fine particles of dirt from the material being filtered. In this modification there is provided cylindrical covers adapted to be positioned on the entry side of each filter element. These covers 41 may be suitably made of a filtering material such as commercial filtering paper. Since this paper is relatively cheap it is ideally adapted for use with this type of filter since the outside surface of the filtering element is rapidly covered with dirt extracted from the material being filtered. Since filter paper is a relatively cheap filtering medium it may be advantageously discarded upon being covered with dirt and a new filter paper cover inserted in its place. As illustrated in Figure 3, the filter paper cover may be easily inserted adjacent the perforated cylindrical members of the filtering element when the locating plate 26 and the cover assembly 35 are removed from the filter casing. When assembled the circular grooves 31 and 32, in the locating plate 26, will fit over the filter paper covers and hold them in place.

In Figure 4 there is illustrated a further modification of the filter of Figure 1. In this modification the perforated cylindrical members of the filter element have been eliminated and cylindrical filter paper elements have been inserted in their place on the recessed portion 25 of the guide block 24 and on the shoulders 19c and 19d of the guide rings 19a and 19b. With this modification, however, it is necessary that more rigid wire inserts be used than in the case where the perforated cylindrical members are also used. It has been found that in the construction where the perforated metal cylinders are omitted that a crimped wire insert of $\frac{1}{16}$ inch wire woven with 8 wires to an inch in either direction will give suitable support for the filter paper members.

In Figure 5 there is illustrated a third modification of the filter of Fig. 1. The elements in the filter illustrated in Fig. 5 are exactly the same as those described in connection with Fig. 1. At the lower end, the perforated metal cylinders are located in guide rings 45 which are positioned on spacer members 46 while at the upper end the cylindrical members are held in spaced relation to each other by spacer blocks 47. The novel feature of this modification is the provision of a felt or fabric bag 48 which is adapted to be positioned over the cylindrical filtering element, as illustrated in Fig. 5. This filtering bag completely covers the filtering element. It is to be noted that in this modification the material to be filtered will preferably be introduced at the topmost part of the filter as through inlet port 49 and will proceed downwardly into the filtering chamber 50. It will then have to pass through the filtering element to the inside thereof in order to reach one of the circular grooves 51a in the outlet header 51. The outlet header 51 of this modification is similar to that of Fig. 1 except that the inlet port 52a and the outlet ports 52b of the inlet chamber 52 are closed due to the fact that an inlet port 49 at the top of the filter is being used. A plurality of ports 51b connect the circular grooves 51a to the outlet chamber 53. These outlet ports are so located as to communicate directly with the inside of the filter element. Thus, the material to be filtered coming in at the top of the filter will proceed downwardly, pass through the filtering surfaces of the filter element to the grooves 51a and then through the outlet passages 51b into the outlet port 53.

The filtering bag of this modification may be advantageously made by bringing together and sewing, as at seams 54 and 55, separate pieces of filtering cloth. The outermost end of the filtering bag may be prevented from curling up by wrapping a few turns of cord 56 around the filter element at that point, as at 57.

Thus, there is illustrated in Fig. 5, a filter assembly having filtering elements that are rigid and non-collapsible which are covered with a removable filter bag. This filter bag may be readily removed and cleaned or if desirable it may be discarded and a new bag inserted in its place.

In Fig. 6 there is shown a modification of the construction of the perforated filtering cylinders used in Figs. 1, 2, 3 and 5. A plurality of indentations 60 have been put in the outer perforated cylinder 61 so that there is formed a series of reinforcing projections 60a extending across the filtering space 62 to abut the inner perforated cylinder 63. These reinforcing projections 60a act as braces and cause both cylinders to act together in resisting buckling of the element. As many indentations may be used as is required for the operating pressure and length of element. Satisfactory results have been obtained by locating the indentations in rows with the indentations approximately 4 inches apart and the indentations in each row staggered in relation to those in the adjoining rows.

In Fig. 7 there is illustrated another method of making the perforated cylinders used in Figures 1, 2, 3 and 5 self-supporting. In this modification the metal defining each hole in the outer perforated cylinder 61 has been pushed inwardly so that it bridges the opening between the inner and outer cylinders. These inwardly projecting arms 66 act as braces between the cylinders and thus tend to prevent buckling. It is to be noted that the ends of the arms 66 will be uneven due to the manner in which they are formed and as a result fluid will be allowed to flow between the ends and the inner cylinder. The holes of the outer cylinder should be staggered with respect to the holes in the inner cylinder both in a lengthwise direction and in a direction around the periphery of the cylinders.

Figure 8 discloses another method of making the cylinders used in Figures 1, 2, 3 and 5 self-supporting. In this embodiment the perforations in both the inner and the outer cylinders are extended inwardly to abut a solid cylindrical sheet 68. Thus each sheet is braced by a plurality of arms. As previously stated the ends of these perforations are uneven and fluid is permitted to pass between the ends and the solid sheet 68.

In the modifications shown in Figs. 7 and 8, the distance between the inner and outer cylinders may advantageously be made approximately one-eighth inch and the metal used for the cylinders may be 24 gauge sheet stock. Perforations $\frac{1}{16}$ in diameter spaced $\frac{1}{2}''$ on center will afford satisfactory filtering. While Fig. 7 shows all the perforations in the outer cylinder dented inwardly, and Fig. 8 discloses all the holes in both cylinders dented inwardly toward the solid sheet 68, it will be understood of course that for some of the shorter lengths of filter elements it will be necessary to dent in only a fraction of the total perforations to secure adequate support for the element.

It is to be particularly noted that by using a double perforated screen in each element the applicant has not only provided means for making the element structurally operable but has also provided a filter element having twice the filtering area as an element having only a single screen.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A filter element comprising an inner perforated cylinder, an outer perforated cylinder disposed in spaced relation with said inner cylinder, a spacer cylinder positioned between said inner and outer cylinders, said inner and outer cylinders having integrally formed support arms abutting said spacer cylinder for imparting transverse rigidity to the element.

2. In a filter a cylindrical casing, a header secured to said cylindrical casing, said header having a plurality of radially spaced circular grooves, an inlet passage in said header having openings into the interior of said casing between said circular grooves, and a discharge passage in said header having openings into the interior of said casing through said circular grooves, cylindrical filter elements having inner and outer filter surfaces and having lower end portions disposed in said grooves and a cover member having depending flanges abutting the top of said filter elements for holding them in place.

3. In a filter, a casing having inlet and outlet ports and a removable cover, cylindrical filtering elements disposed in spaced relation in said casing concentric with each other and with said casing, each of said elements comprising an inner perforated filter, an outer perforated filter disposed in spaced relation with said inner filter, a rigid spacer cylinder positioned between said inner and outer cylinders, said inner and outer cylinders being disposed between the inlet and the outlet ports having integrally formed support arms abutting said spacer cylinder for imparting transverse rigidity to the element.

4. In a cylinder, a casing having inlet and outlet ports and a removable cover, cylindrical filtering elements disposed in spaced relation in said casing concentric with each other and with said casing, each of said elements comprising an inner perforated cylinder, an outer perforated cylinder disposed in spaced relation with said inner cylinder, a rigid spacer cylinder positioned between said inner and outer cylinders, said inner and outer cylinders having integrally formed support arms abutting said spacer cylinder for imparting transverse rigidity to the element, said outlet ports having access to the space between said inner and outer cylinders and said rigid cylinders while said inlet is disposed to introduce the material to be filtered on the side of said filtering element removed from said rigid cylinder, whereby said material must pass through at least one cylindrical filtering element in passing from the inlet to the outlet port.

5. In a filter, a casing having inlet and outlet ports disposed near the bottom thereof and a removable cover, cylindrical filtering elements positioned in said casing, each of said elements comprising an inner perforated cylinder, an outer perforated cylinder disposed in spaced relation with said inner cylinder, a rigid solid spacer cylinder positioned between said inner and outer cylinders, said inner and outer cylinders having integrally formed support arms abutting said spacer cylinder for imparting transverse rigidity to the elements, guide members in said casing adapted to receive the lower end of said elements, spacer rings positioned between the upper end of said inner and outer cylinders for holding them in spaced relation and a retainer plate disposed between said removable cover and said spacer ring for clamping said elements in place.

6. A filter comprising a hollow casing having an inlet port, a header disposed at one end of said casing having a plurality of grooves and a discharge port in flow communication with the interior of said casing through said grooves, filtering elements in said casing having end portions disposed in said grooves, each of said elements comprising an inner perforated cylinder, an outer perforated cylinder disposed in spaced relation with said inner cylinder, a rigid solid spacer cylinder positioned between said inner and outer cylinders, said inner and outer cylinders having integrally formed support arms abutting said spacer cylinder for imparting transverse rigidity to the elements, said inlet port being disposed to introduce fluid to the side of said filtering element removed from said solid spacer cylinder, whereby fluid will flow through said filtering elements against the side walls of said solid cylinders and down said walls through said grooves to said outlet port.

AUGUST H. SLEPICKA.

REFERENCES CITED

The following references are of record in the file of this patent:

UNITED STATES PATENTS

| Number | Name | Date |
|---|---|---|
| 651,621 | Black et al. | June 12, 1900 |
| 664,572 | McDougall | Dec. 25, 1900 |
| 796,519 | Kneuper | Aug. 8, 1905 |
| 830,184 | Smith | Sept. 4, 1906 |
| 879,197 | Schirmer | Feb. 10, 1908 |
| 1,000,405 | Healy | Aug. 15, 1911 |
| 1,179,157 | Braun | Apr. 11, 1916 |
| 1,337,756 | Darlington | Apr. 20, 1920 |
| 1,456,995 | Collins | May 22, 1923 |
| 1,502,545 | Bowes | July 22, 1924 |
| 1,646,378 | Sweetland et al. | Oct. 18, 1927 |
| 1,937,415 | Sidney | Nov. 28, 1933 |
| 2,024,719 | Cocks et al. | Dec. 17, 1935 |
| 2,107,406 | Wood | Feb. 8, 1938 |
| 2,221,210 | Soderquist | Nov. 12, 1940 |
| 2,276,118 | Taylor | Mar. 10, 1942 |

FOREIGN PATENTS

| Number | Country | Date |
|---|---|---|
| 469,175 | France | July 25, 1914 |
| 882,093 | France | Feb. 15, 1943 |
| 192,074 | Germany | Dec. 4, 1907 |